Patented Nov. 16, 1937

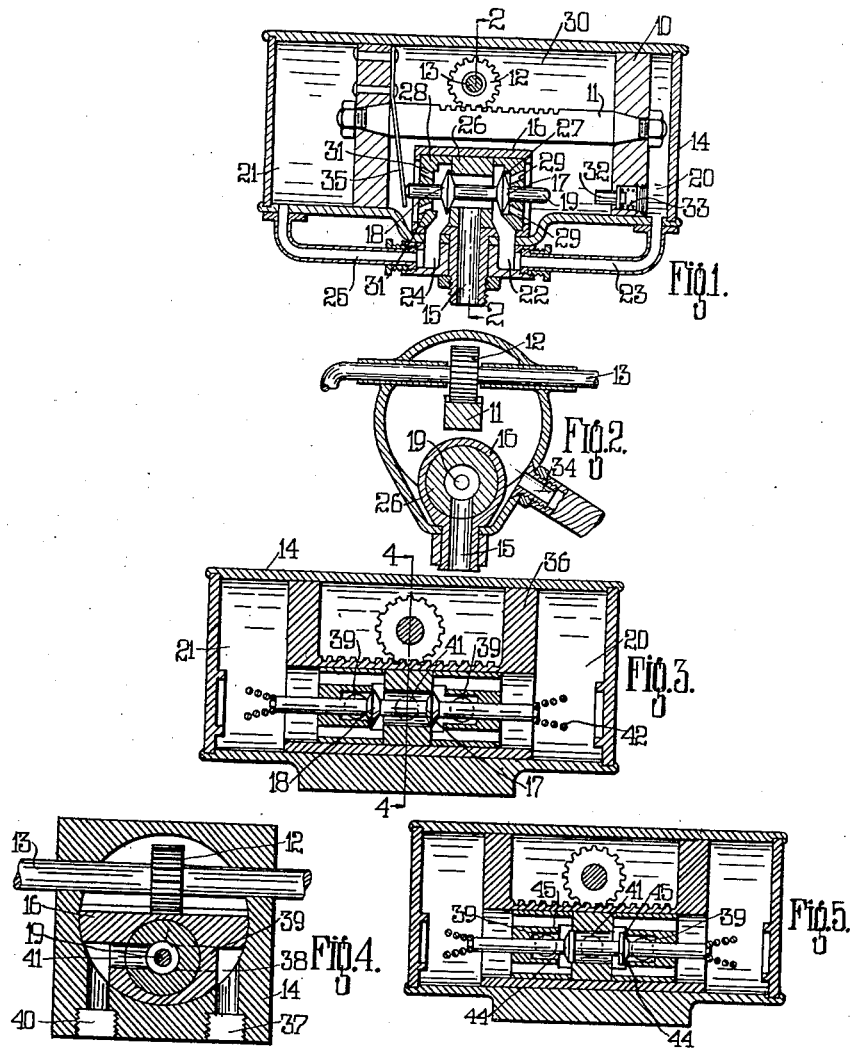

2,098,936

UNITED STATES PATENT OFFICE 2,098,936

WINDSHIELD WIPER MOTOR

Fullerton George Gordon Armstrong, Beverley, and Howard Clayton-Wright, Stratford-on-Avon, England; said Clayton-Wright assignor to said Armstrong Application August 25, 1936, Serial No. 97,862
In Great Britain June 12, 1935

7 Claims. (Cl. 121—164)

The present invention relates to windshield wiper motors of the type operated by pressure such as for example from the oil pressure lubricating system of the vehicle or other movable object, the screen of which is to be cleaned, or again from a separate pump carried by the vehicle.

According to the present invention and from one aspect thereof a pair of valves reciprocable in unison within a valve housing, which is located between the heads of a double acting piston connected to the wiper and reciprocable within a cylinder, is at all times subjected to fluid pressure with the effective resultant pressure first in one and then in the opposite direction in order to regulate a supply of liquid under pressure to chambers formed between the piston heads and the ends of said cylinder and thus to control the displacement of said piston heads and the wiper.

From another aspect of the present invention a pair of valves are reciprocable in unison between positions at which different cross sectional areas are available to fluid flow through a valve housing, which is located between the heads of a double acting piston connected to the wiper and reciprocable within a cylinder, one valve presenting its relatively small pressure area when the other presents its relatively large area to fluid flow and vice versa, in order to regulate a supply of liquid under pressure to chambers formed between the piston heads and the ends of said cylinder and thus to control the displacement of said piston heads and the wiper.

Where reference is made herein to a double acting piston operating within a cylinder, this is intended to include a pair of pistons moving in unison within one or a pair of cylinders with one piston making its compression stroke when the other is on its suction stroke.

The invention is more particularly described with reference to the accompanying drawing, in which:—

Figure 1 is a section through a mechanism for operating a windshield wiper hydraulically.

Figure 2 is a section on the line 2—2 of Figure 1.

Figure 3 is a longitudinal section through a modified form of construction of operating mechanism.

Figure 4 is a section on the line 4—4 of Figure 3.

Figure 5 is a sectional view corresponding to Figure 3, but of a further modified form of construction.

In the construction according to Figures 1 and 2 a double acting piston includes a pair of piston heads 10 interconnected by a rack 11 in engagement with a pinion 12 carried by a spindle 13 of the windshield wiper (not shown), rotation of the spindle 13 to cause operation of the wiper being effected on longitudinal displacement of the rack 11 and the piston heads 10 within a cylinder 14.

Where the windshield wiper is operated from the pressure supply pipe for the lubricating system of a vehicle, oil under pressure is fed to the cylinder 14 through an inlet 15, the pipe connected to the inlet being valve controlled with the control preferably in the region of the driver's or pilot's seat, such as for example, on the dash board of the vehicle. Where, however, a separate pump is provided on the vehicle for the purpose of actuation of the wiper, a liquid other than oil may be used.

A valve housing 16 is rigidly mounted in position within the cylinder 14 and according to the position of a pair of valve elements 17, 18, which are mounted on a spindle 19, so is the flow of oil or other liquid from the inlet 15 directed either to the chamber 20 or the chamber 21 within the cylinder 14. A conduit 22 is provided which has hydraulic communication with a conduit 23 leading to the chamber 20 whilst a similar conduit 24 on the opposite side of the inlet 15 leads to a conduit 25 for the supply of oil or other liquid to the chamber 21. A sleeve 26 rigidly connected with the valve casing 16 is longitudinally bored to receive the valve spindle 19, the cross sectional area of the bore being less than the cross sectional area of the seatings 27, 28, which form the outer limits of the stroke of the valves 17, 18, respectively.

Holes 29 are provided in the seating 27 to permit of hydraulic communication between the space 30 bounded at each end by the piston heads 10 and the conduits 22, 23, when the valve 17 is off its seat 27, whilst similarly holes 31 are formed in the valve seat 28 to establish hydraulic communication between the space 30 and the conduits 24, 25.

A stop member 32 is resiliently mounted by means of a spring 33 in the right hand piston head 10, said stop member lying co-axial with the valve spindle 19.

In the position of the valves shown in Figures 1 and 2 of the drawing, oil or other liquid fed to the inlet 15 passes into the conduits 22, 23, thence into the chamber 20 to displace the double acting piston towards the left. While this movement of the piston heads is proceeding the valves 17, 18 remain in the position shown in Figure 1 of the drawing, this being due to the fact that the effective area of the valve 17 acted upon by the oil or other liquid is greater than that of the valve 18 due to the difference in cross sectional area between the seat 27 and the bore in the sleeve 26. While this movement of the piston heads towards the left is proceeding oil or other liquid from the chamber 21 is forced through the conduits 25, 24, and the holes 31 into the space 30 between the piston heads to be finally evacuated from said space 30 through an exit orifice 34 thereof back to the pump, or back to the sump of the vehicle when the pressure is under the control of the lubricating system.

As the right hand piston head 10 approaches the end of its movement, however, the stop member 32 comes into contact with the valve spindle 19 causing compression of the spring 33 so that, as the spindle moves towards the left, the spring will effect a quick reversal of the valve to force the valve 18 on to its seat 28 whereupon the feed of oil or other liquid from the inlet 15 is reversed, that is to say, pressure is applied to the chamber 21 to force the piston heads towards the right and during this movement oil or other liquid from the chamber 20 passes via the conduits 23, 22 and holes 29 into the space 30 for evacuation from the cylinder.

A spring 35 carried by the piston 10 displaces the valve spindle 19 towards the right at the end of said travel of the piston heads.

In the modified form of construction illustrated in Figures 3 and 4 a double acting piston 36 carries the valve gear, that is to say, the valve gear is displaced with the piston. In this particular construction an inlet 37 is provided which by virtue of a passage 38 is in hydraulic communication at all times with inlet orifices 39 of the valve chamber whilst an exhaust 40 is in hydraulic communication with the exhaust port 41 of said valve chamber. The exhaust port 41 is positioned between the valves 17, 18 and like the construction in Figures 1 and 2, each valve during displacement of the piston is adapted to remain on its seat until the end of the piston stroke is reached by virtue of the cross-sectional difference between its seat and the bore of the valve housing around that portion of the spindle situated between the valve.

The passage 38, of course, within the valve extends only between the orifices 39 so as to prevent direct passage of liquid from the inlet 37 to the chambers 20, 21, of the cylinder 14. In this construction springs 42 are provided to flick the valve spindle 19 over when the valve end together with the piston has reached the end of its path of travel.

In the further modified form of construction illustrated in cross-section in Figure 5, it will be appreciated that instead of permitting each valve to operate between a pair of valve seatings of different bore, each valve, at one end of its stroke closes the bore of a valve seating and at the other end of its stroke enters a bore in hydraulic communication with the exhaust port. As the bore in communication with the exhaust port is of greater section than the cross-sectional area of the valve seatings it follows that the pressure on that valve lying within the bore is greater than that exerted on the valve situated on one of the seatings controlling the inlet port whereby the inlet port associated with one chamber is maintained closed while the other chamber is hydraulically accessible to the other port.

In the construction according to Figure 5, valves 44 are displaceable in unison to and from valve seatings 45 of relatively small cross-section and a bore 46 of relatively large cross-section which is in hydraulic communication with the exhaust port 41. When either of the valves 44 enters the bore 46 it functions in exactly the same way as if it were seated on the end of the corresponding bore in the construction shown in Figure 3, to permit of communication of one inlet port with its chamber and to cut off the other inlet port from the chamber associated therewith.

In the position of the valve shown in the drawing the chamber 21 is permitted hydraulic communication with the left hand inlet port 39, the chamber 20 is cut off from the right hand inlet port 39. In other words, the valves 44 in the modified form of construction illustrated in Figure 5 are of the piston type insofar as their action within the bore 46 is concerned. Otherwise the operation is identical with that described in Figure 3.

We declare that what we claim is:—

1. A control mechanism for a windshield wiper comprising a cylinder, a double acting piston operating within said cylinder, a member disposed within said cylinder between the heads of said piston and having a bore therethrough, means providing a pair of valve seats in axial alignment with said bore and disposed one on each side of said member and spaced therefrom, a movable solid spindle extending through said bore and said valve seats, a pair of valves fixedly mounted on said spindle and disposed one on each side of said member within the spaces between said member and said valve seats, conduit means including ports opening through said valve seats, and fluid pressure means passing through said conduit means for displacing said piston and effecting relative movement between said valve seats and said valves for alternately closing one of said valve seats and the remote end of said bore whereby to effect reciprocation of said piston and displacement of a connected wiper.

2. A control mechanism for a windshield wiper comprising a cylinder, a double acting piston operating within said cylinder, a member disposed within said cylinder between the heads of said piston and having a bore therethrough, means providing a pair of valve seats in axial alignment with said bore and disposed one on each side of said member and spaced therefrom, a movable solid spindle extending through said bore and said valve seats, a pair of valves fixedly mounted on said spindle and disposed one on each side of said member within the spaces between said member and said valve seats, conduit means including ports opening through said valve seats, fluid pressure means passing through said conduit means for displacing said piston and effecting relative movement between said valve seats and said valves for alternately closing one of said valve seats and the remote end of said bore whereby to effect reciprocation of said piston and displacement of a connected wiper, and spring means for effecting a quick reversal of said spindle and the valves carried thereby.

3. A control mechanism for a windshield wiper comprising a cylinder, a double acting piston disposed within said cylinder, a member disposed within said cylinder between the heads of said piston and having a bore therethrough, means providing a pair of valve seats in axial alignment with said bore and disposed one on each side of said member and spaced therefrom, a movable solid spindle extending through said bore and said valve seats, a pair of valves fixedly mounted on said spindle and disposed one on each side of said member within the spaces between said member and said valve seats, the cross sectional area of said valve seats being identical but different from the cross sectional area of said bore whereby said valves present different cross sectional areas to flowing fluid, conduit means including ports opening through said valve seats, and fluid pressure means passing through said conduit means for displacing said piston and effecting relative movement between said valve seats and said valves for alternately closing one of said valve seats and the remote end of said bore whereby to effect reciprocation of said piston and displacement of a connected wiper.

4. A control mechanism for a windshield wiper comprising a cylinder, a double acting piston disposed within said cylinder, a member disposed within said cylinder between the heads of said piston and movable with said piston, said member having a bore therethrough, means providing a pair of valve seats in axial alignment with said bore and spaced from said member one on each side thereof, said valve seats being movable with said piston, a solid spindle extending through said bore and said valve seats, means for mounting said spindle for movement relative to said piston, a pair of valves fixedly mounted on said spindle and disposed one on each side of said member within the spaces between said member and said valve seats, conduit means including ports opening through said valve seats, and fluid pressure means passing through said conduit means for displacing said piston and effecting a relative movement between said valve seats and said valves for alternately closing one of said valve seats and the remote end of said bore whereby to effect reciprocation of said piston and displacement of a connected wiper.

5. A control mechanism for a windshield wiper comprising a cylinder, a double acting piston operating within said cylinder, a member disposed within said cylinder between the heads of said piston and having a bore therethrough, means providing a pair of valve seats in axial alignment with said bore and disposed one on each side of said member and spaced therefrom, said valve seats being movable with said piston and being of a cross sectional area less than that of said bore, a spindle extending through said bore and said valve seats, means for mounting said spindle for movement relative to said piston, a pair of valves fixedly mounted on said spindle and disposed one on each side of said member within the spaces between said member and said valve seats, said valves being adapted to alternately enter and close said bore, conduit means including ports opening through said valve seats, and fluid pressure means passing through said conduit means for displacing said piston and effecting relative movement between said valve seats and said valves for alternately setting one of said valves on its cooperating valve seat and causing the other of said valves to enter and close the remote end of said bore whereby to effect reciprocation of said piston and displacement of a connected wiper.

6. A control mechanism for a windshield wiper comprising a cylinder, a double acting piston operating within said cylinder, a member disposed within said cylinder between the heads of said piston and having a bore therethrough, means providing a pair of valve seats in axial alignment with said bore and disposed one on each side of said member and spaced therefrom, a spindle extending through said bore and said valve seats, means for mounting said spindle for movement relative to said member, a pair of valves fixedly mounted on said spindle and disposed one on each side of said member within the spaces between said member and said valve seats, said valves being of a size which permits them to enter and close said bore, conduit means including ports opening through said valve seats, and fluid pressure means passing through said conduit means for displacing said piston and effecting relative movement between said valve seats and said valves for alternately seating one of said valves on its cooperating valve seat and causing the other of said valves to enter and close the remote end of said bore whereby to effect reciprocation of said piston and displacement of a connected wiper.

7. A control mechanism for a windshield wiper comprising a cylinder, a double acting piston operating within said cylinder, a member disposed within said cylinder between the heads of said piston and movable with said piston, said member having a bore therethrough, means providing a pair of valve seats in axial alignment with said bore and disposed one on each side of said member and spaced therefrom, a spindle extending through said bore and said valve seats, means for mounting said spindle for movement relative to said piston, a pair of valves fixedly mounted on said spindle and disposed one on each side of said member within the spaces between said member and said valve seats, said valves being of a size which permits them to enter and close said bore, conduit means including ports opening through said valve seats, and fluid pressure means passing through said conduit means for displacing said piston and effecting relative movement between said valve seats and said valves for alternately seating one of said valves on its cooperating valve seat and causing the other of said valves to enter and close the remote end of said bore whereby to effect reciprocation of said piston and displacement of a connected wiper.

FULLERTON GEORGE
GORDON ARMSTRONG.
HOWARD CLAYTON-WRIGHT.